No. 821,876. PATENTED MAY 29, 1906.
J. C. LAUTH.
CAP FOR PIPES.
APPLICATION FILED JULY 31, 1905.

WITNESSES=
D. Gurnee
L. Thow

INVENTOR=
John C Lauth
by Ogyud & Sans
his Attys

UNITED STATES PATENT OFFICE.

JOHN C. LAUTH, OF ROCHESTER, NEW YORK.

CAP FOR PIPES.

No. 821,876.  Specification of Letters Patent.  Patented May 29, 1906.

Application filed July 31, 1905. Serial No. 272,117.

*To all whom it may concern:*

Be it known that I, JOHN C. LAUTH, a citizen of the United States, and a resident of Rochester, in the county of Monroe and State of New York, have invented certain new and useful Improvements in Caps for Pipes, of which the following is a specification.

This invention relates to a cap for the end of a pipe of ductile material, generally of lead.

Figure 1:
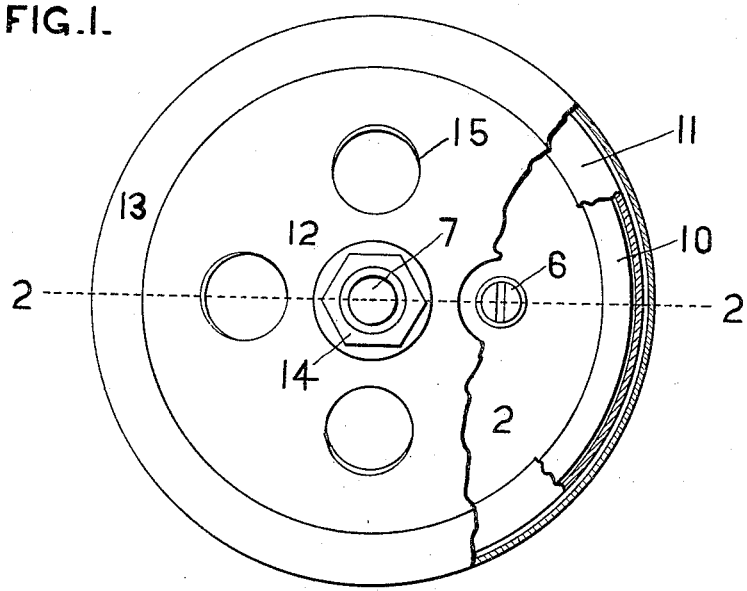
Figure 2:
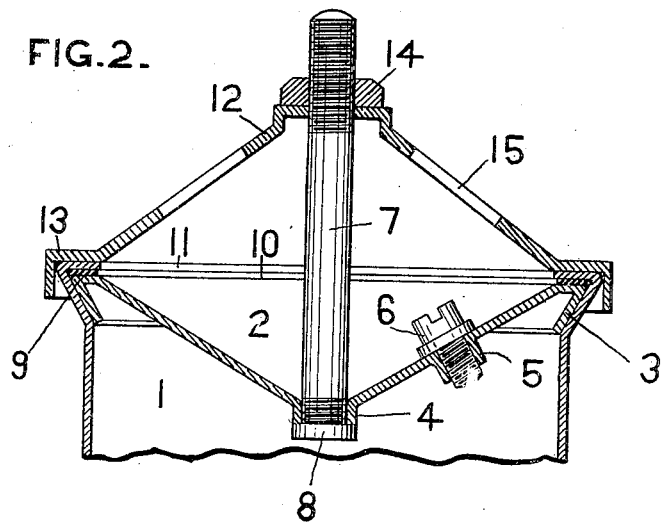

In the drawings, Figure 1 is a top plan view of a cap embodying this invention applied to the upper end of a pipe made of lead or other ductile material, parts being broken away and parts being shown in section to exhibit the internal construction; and Fig. 2 is a vertical section on the line 2 2 of Fig. 1.

The pipe 1, of lead or other ductile material, has an internal flange-plate 2 inserted into its upper end. The said flange-plate has a flange 3, that is conical in form, so that the plate may be inserted in the upper end of the pipe, and on being pressed downward the ductile material of the pipe is expanded into conical form and fits tightly against the flange 3. The said flange 3 has a central perforation 4 and, if desired, may have a test-perforation 5, closed by a screw 6. The central perforation 4 takes a bolt 7, preferably having a head 8. The said bolt may also be screw-threaded, as shown, to fit corresponding threads in the interior of the perforation 4. The flange-plate 2 is dished, as shown, having its convexity downward or extending inward into the pipe. The said flange-plate adjacent to its outer edge has an upper flattened portion 9, upon which may, if desired, be placed a washer or gasket 10. The upper edge of the pipe 1 is then bent inward over the gasket, or if the gasket is not employed the said edge is bent inward over the upper edge of the flange-plate 2. Then a dished or convex cap-plate 12, provided with a rim or flange 13, fitting upon the rim 11 of the pipe 1, is placed in position. The bolt 7 passes through the center of said cap-plate 12, and a nut 14 pulls the flange-plate 2 and the cap-plate 12 together to clamp between them the edge or flange 11 of the pipe 1, together with the gasket 10 when the latter is used.

One or more perforations 15 through the cap-plate give access to the test-screw 6.

This device is useful for closing the ends of pipes of lead or other ductile material and is often employed in connection with testing such pipes by water test to determine whether a pipe system is water or gas tight.

What I claim is—

1. The combination of a pipe of ductile material having an inwardly-projecting integral flange, a flange-plate situate within the pipe and adapted to fit against said flange, a cap-plate outside of said flange and fitting upon the same, and means for clamping the said two plates together upon the flange of said pipe.

2. The combination of a pipe of ductile material having an inwardly-projecting integral flange, a conical flange-plate situate within the pipe and having a base-surface adapted to fit against said flange and to expand said pipe, a cap-plate outside of said flange and fitting upon the same, and means for clamping the said two plates together upon the flange of said pipe.

3. The combination of a pipe of ductile material having an inwardly-projecting integral flange, a flange-plate situate within the pipe and adapted to fit against said flange, a cap-plate outside of said flange and fitting upon the same, a gasket between one of said plates and the flange of said pipe, and means for clamping the said two plates and the gasket together upon the flange of said pipe.

4. The combination of a pipe of ductile material having an inwardly-projecting integral flange, a conical flange-plate situate within the pipe and having a base-surface adapted to fit against said flange and to expand said pipe, a cap-plate outside of said flange and fitting upon the same, a gasket between one of said plates and the flange of said pipe, and means for clamping the said two plates and the gasket together upon the flange of said pipe.

5. The combination of a pipe of ductile material having an inwardly-projecting integral flange, a dished flange-plate having its convexity adapted to project into the interior of the pipe and having its edge adapted to fit against the inner side of said flange, a dished cap-plate outside of said flange and fitting upon the outer surface of said flange, and means for clamping the said two plates together upon the said flange.

6. The combination of a pipe of ductile material having an inwardly-projecting integral flange, a flange-plate situate within the pipe and adapted to fit against the inner surface of said flange, a test-screw in said flange-plate, a cap-plate outside of said flange and fitting upon the same and having an opening for access to the test-screw, and means for fastening the said two plates together upon the flange of said pipe.

JOHN C. LAUTH.

Witnesses:
    D. GURNEE,
    L. THON.